US010088712B2

(12) United States Patent
Nakanishi et al.

(10) Patent No.: US 10,088,712 B2
(45) Date of Patent: Oct. 2, 2018

(54) METHOD OF PRODUCING DISPLAY PANELS

(71) Applicant: SHARP KABUSHIKI KAISHA, Sakai, Osaka (JP)

(72) Inventors: Youhei Nakanishi, Sakai (JP); Masayuki Kanehiro, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/577,168

(22) PCT Filed: May 20, 2016

(86) PCT No.: PCT/JP2016/064992
§ 371 (c)(1),
(2) Date: Nov. 27, 2017

(87) PCT Pub. No.: WO2016/190234
PCT Pub. Date: Dec. 1, 2016

(65) Prior Publication Data
US 2018/0180912 A1 Jun. 28, 2018

(30) Foreign Application Priority Data
May 27, 2015 (JP) .................................. 2015-107566

(51) Int. Cl.
G02F 1/1339 (2006.01)
G09F 9/00 (2006.01)
G02F 1/1333 (2006.01)

(52) U.S. Cl.
CPC ...... *G02F 1/1339* (2013.01); *G02F 1/133351* (2013.01); *G09F 9/00* (2013.01); *G02F 2201/56* (2013.01)

(58) Field of Classification Search
CPC ............. G02F 1/1339; G02F 1/133351; G02F 2201/56
See application file for complete search history.

(56) References Cited

U.S. PATENT DOCUMENTS

2013/0186853 A1* 7/2013 Sugimoto ......... G02F 1/133351
216/23

FOREIGN PATENT DOCUMENTS

| JP | S54-001317 A | 1/1979 |
| JP | S56-107214 A | 8/1981 |

(Continued)

*Primary Examiner* — Kevin Quarterman
(74) *Attorney, Agent, or Firm* — ScienBiziP, P.C.

(57) ABSTRACT

A producing method includes a sealing agent disposing process of preparing substrates one of which has thin film patterns thereon and disposing sealing agent portions on the one substrate to surround the thin film patterns, respectively, a bonding process of bonding the substrates via the sealing agent portions and forming a bonded substrate after the sealing agent disposing process, a cutting process of cutting the substrates being included in the bonded substrate and outside the sealing agent portions after the bonding process, and a grinding process of grinding collectively the substrates and the sealing agent portions of the bonded substrate along the outline after the cutting process such that overlapped portions of the substrates and the sealing agent portion are partially ground collectively and ground surfaces of the substrates and the sealing agent portion are aligned with each other.

7 Claims, 18 Drawing Sheets

(56) References Cited

FOREIGN PATENT DOCUMENTS

| | | |
|---|---|---|
| JP | 3874899 B2 | 1/2007 |
| JP | 2009-116214 A | 5/2009 |
| JP | 2010-020221 A | 1/2010 |
| JP | 2013-152310 A | 8/2013 |
| JP | 2014-210670 A | 11/2014 |

* cited by examiner

METHOD OF PRODUCING DISPLAY PANELS

TECHNICAL FIELD

The present technology relates to a method of producing display panels.

BACKGROUND ART

A method of producing a display panel such as a liquid crystal panel included in a display device as described below has been known. A pair of substrates one of which includes a thin film pattern of semiconductor elements such as thin film transistors (TFTs) is prepared. The substrates are bonded to each other via a sealing agent portion surrounding the thin film pattern and bonded substrates are cut along an outline of the display panel and a display panel is produced.

For example, Patent Document 1 describes a method of producing a liquid crystal panel in which liquid crystals are injected to a space between the substrates that are bonded via the sealing agent and the bonded substrates are cut to obtain liquid crystal panels. In such a producing method, the substrates in a pair are cut along a substantially straight cutting line together with the sealing agent with a dicing method such that cut surfaces of the substrates and a cut surface of the sealing agent are aligned with each other. Therefore, the width dimension of the sealing agent is decreased after cutting the substrates and a frame width of the display panel to be produced is decreased.

RELATED ART DOCUMENT

Patent Document

Patent Document 1: Japanese Patent No 3874899

Problem to be Solved by the Invention

A display panel produced with the above producing method generally has a front view of a square outline or a rectangular outline. Recently, according to variety of usage of the display panels, display panels having an outline a part of which is curved such as a semicircular outline have been produced. In producing such a display panel having a curved outline, at least a part of the bonded substrates are required to be cut along a curved line.

However, when the substrates in a pair are cut together with the sealing agent along the curved cutting line with a dicing method or a scribing method, the cutting may not be performed along the curved cutting line due to a stress of the sealing agent that closely adheres to the substrates and a crack may be unintentionally generated at a different portion from the cutting line. As a result, the outline of the display panel to be produced may be deformed or a crack may be generated in a portion where a crack should not be generated and thus, accuracy of the shape of the display panel to be produced may be lowered. If the cutting operation is performed at a portion away from the sealing agent that is less likely to be influenced by a stress of the sealing agent, the width of a frame portion of the display panel to be produced is increased and reduction in the frame width is not achieved.

DISCLOSURE OF THE PRESENT INVENTION

The present technology was made in view of the above circumstances. An object is to produce display panels each having a curved outline with high precision and including a frame portion having a reduced width.

Means for Solving the Problem

The technology described in this specification is a method of producing display panels each having an outline part of which is curved, and the method includes a sealing agent disposing process or preparing substrates in a pair one of which has thin film patterns thereon and disposing sealing agent portions on the one substrate to surround the thin film patterns, respectively, a bonding process of bonding the substrates in a pair via the sealing agent portions and forming a bonded substrate, the bonding process being performed after the sealing agent disposing process, a cutting process of cutting the substrates in a pair that are included in the bonded substrate and outside the sealing agent portions each surrounding the thin film pattern in a plan view, the cutting process being performed after the bonding process, and a grinding process of grinding collectively the substrates in a pair and one of the sealing agent portions that are overlapped with each other a plan view after the cutting process such that overlapped portions of the substrates in a pair and the sealing agent portion are partially ground collectively and ground surfaces of the substrates in a pair and a ground surface of the one of the sealing agent portions are aligned with each other.

According to the above method of producing the display panels, in the cutting process, the substrates that are outside each sealing agent portion surrounding the thin film pattern included in the bonded substrate are cut. Thus, the bonded substrate is briefly cut. Therefore, in the cutting process, the bonded substrate is cut along a substantially straight line near the curved edge surface and cracks that are different from desired cutting lines are less likely to be generated. If cracks different from the desired cutting lines are generated, the cutting lines are away from the portion to be the outline portion and therefore, the cracks are less likely to adversely affect the shape accuracy of the display panel.

According to the producing method, in the grinding process, the substrates in a pair and the sealing agent portion are collectively ground to form the curved edge surface. Therefore, undesired cracks are less likely to be generated near the curved edge surface. The substrates in a pair and the sealing agent portion are collectively ground along the outline of the display panel such that the ground surfaces of the substrates and the ground surface of the sealing agent portion are aligned with each other. Thus, the curved outline forming an outer shape of the display panel is formed with high precision. In the grinding process, the substrates in a pair and the sealing agent portion are collectively ground such that the ground surfaces of the substrates and the ground surface of the sealing agent portion are aligned with each other. Accordingly, the width dimension of the sealing agent portion after the grinding process is reduced and the frame width of the display panel is reduced. According to the method of producing the display panels, the display panels each having a curved outline can be produced with high precision while reducing a width of a frame portion.

In the above method of producing the display panels, in the sealing agent disposing process, each of the sealing agent portions may be disposed along the outline of the display panel over a predefined width.

If the width dimension of the sealing agent portion disposed on the substrate is reduced at most to reduce the width dimension of the frame portion of the display panel, the bonded substrate may not have effective bonding strength. As a result, separation may be caused in the bonded substrate in the cutting process and producing yield of the display panels may be lowered. According to the above producing method, in the sealing agent disposing process, the sealing agent portion is disposed with a width dimension such that the bonded substrate after the forming of the bonding substrate has effective bonding strength. Thus, the separation is less likely to be caused in the bonded substrate in the cutting process. The sealing agent portion is disposed along the outline of the display panel and the substrates and the sealing agent portion are collectively ground along the outline of the display panel with keeping the bonding strength that restricts the separation in the bonded substrate in the grinding process. As a result, producing yield is less likely to be lowered in the producing process of the display panels.

In the method of producing the display panels each of which includes a mounting area in a part of a panel surface area thereof, the mounting area where a driving component for driving the display panel is mounted, and in the cutting process, a portion of an edge surface of the mounting area may be cut along the outline of the display panel.

According to such a producing method, in the cutting process, an edge surface portion of the mounting area having the linear plan view outline is cut straight along the outline of the display panel. Accordingly, the edge surface of the mounting area of the display panel is formed while cracks that are different from the desired cutting lines are less likely to be generated. In the mounting area of the display panel, the edge surface of the display panel is formed without performing the grinding process and therefore, the process of producing the display panel is simplified.

In the method of producing the display panels each of which has a circular shape and includes a mounting area in a part of a panel surface area thereof, the mounting area where a driving component for driving the display panel is mounted, in the grinding process, an entire area of an edge surface of the bonded substrate may be subjected to the grinding process.

According to such a producing method, the curved outline of the display panel is formed over an entire area of the edge surface of the bonded substrate while keeping the mounting area for a driving component by grinding the entire area of the edge surface of the bonded substrate in the grinding process. According, a specific method of producing display panels having a circular outline with high accuracy is provided while reducing a frame width.

In the method of producing the display panels each having a through hole that is through a thickness thereof, in the sealing agent disposing process, another sealing agent portion may be further disposed around a portion of a plate surface of the one substrate where a through hole is to be formed. The method may further include a preliminary through hole forming process of forming a preliminary through hole in a portion of the bonded substrate where the through hole is to be formed, the preliminary through hole having a diameter smaller than that of the through hole, the preliminary through hole forming process being performed after the bonding process. In the grinding process, the substrates in a pair and the sealing agent portion at an opening edge surface of the preliminary through hole may be collectively ground to increase the diameter of the preliminary through hole and form the through hole.

According to such a producing method, in the grinding process, the substrates in a pair and the sealing agent portion are collectively ground to increase the diameter of the preliminary through hole. Thus, the through hole having a desired diameter can be formed while restricting generation of cracks that are not desired lines. Accordingly, a specific method of producing display panels having a through hole that is through the thickness thereof with high accuracy is provided while reducing a frame width.

In the method of producing collectively the display panels, in the cutting process, the bonded substrate may be cut into separated bonded substrates, and each of the separated bonded substrates that are obtained in the cutting process may be subjected to the grinding process.

According to such a producing method, in the grinding process, each of the separated bonded substrates is ground such that the display panels having curved outlines are collectively produced with high accuracy while reducing the frame width.

The method of producing collectively the display panels may further include a layering process of layering the bonded substrates via photo-curable fixing agent, a curing process of irradiating the photo-curable fixing agent with light rays and curing the photo-curable fixing agent, and a separation process of separating each of the bonded substrates included in a layered substrate from the photo-curable fixing agent. In the cutting process, the bonded substrates that may be layered are collectively cut into separated layered substrates, and each of the separated layered substrates that are obtained in the cutting process may be subjected to the grinding process.

According to such a producing method, in the cutting process, the bonded substrates that are layered on each other are collectively cut into pieces and the bonded substrates are collectively cut along the outline of the liquid crystal panels to be produced. Then, in the grinding process, each of the separated layered bonded substrates is ground and the bonded substrates included in each of the separated layered bonded substrates are collectively ground and the curved outline of the liquid crystal panels to be produced can be formed in one step. According to the producing method, the display panels each having a curved outline are collectively produced with high precision while achieving reduction of the frame width. Accordingly, a specific method of collectively producing display panels each having a curved outline with high accuracy is provided while reducing a frame width.

Advantageous Effect of the Invention

According to the technology described in this specification, display panels each having a curved outline and a frame portion having a reduced width are produced with high precision.

MODES FOR CARRYING OUT THE INVENTION

First Embodiment

Figure 1:
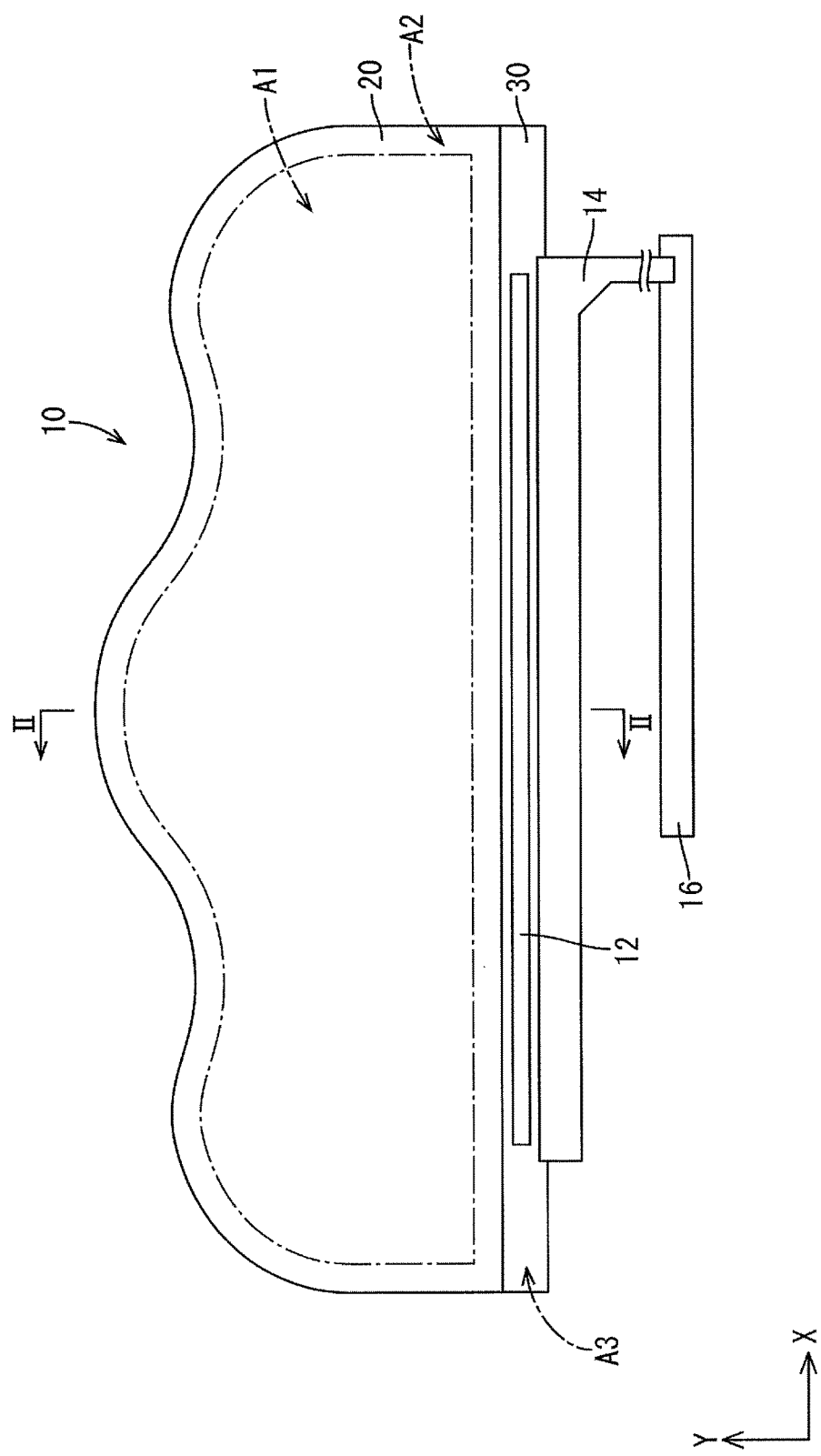
FIG. 1 is a schematic plan view illustrating a liquid crystal panel according to a first embodiment.

A first embodiment will be described with reference to FIGS. 1 to 9. In the present embodiment, a method of producing a liquid crystal panel (an example of a display panel) 10 included in a liquid crystal display device will be described. X-axis, Y-axis and Z-axis may be indicated in the drawings and the axes in each drawing correspond to the respective axes in other drawings. An upper side in FIGS. 2 and 5 to 9 corresponds to an upper side (a front side) of the liquid crystal panel 10. A configuration of the liquid crystal panel 10 will be described. The liquid crystal panel 10 of the present embodiment does not have a general outline plan view shape such as a rectangular shape or a square shape but has an outline shape a part of which is curved. Specifically, as illustrated in FIG. 1, the outline shape of the liquid crystal panel 10 has three arched line portions.

The liquid crystal panel 10 includes a laterally elongated display area A1 in most area thereof and images appear on the display area A1. An area of the liquid crystal panel 10 outside the display area A1 is a non-display area A2 in which images are not displayed. The non-display area A2 includes a frame portion surrounding the display area A1 that is a frame portion of the liquid crystal panel 10. The non-display area A2 includes a mounting area A3 in which an IC chip (an example of a driving component) 12 and a flexible printed circuit board 14 are mounted. The mounting area A3 is locally close to one edge portion of the liquid crystal panel 10 with respect to the Y-axis direction (on a lower side in FIG. 1). The IC chip 12 is an electronic component that drives the liquid crystal panel 10 and a control board 16 that supplies various input signals from the outside to the IC chip 12 is connected to the liquid crystal panel 10 via the flexible circuit board 14. As illustrated in FIG. 1, the mounting area A3 included in a part of the panel surface area of the liquid crystal panel 10 is a laterally elongated rectangular area. The outline shape of the mounting area A3 has long sides extending linearly along the X-axis and short sides extending linearly along the Y-axis.

Figure 2:
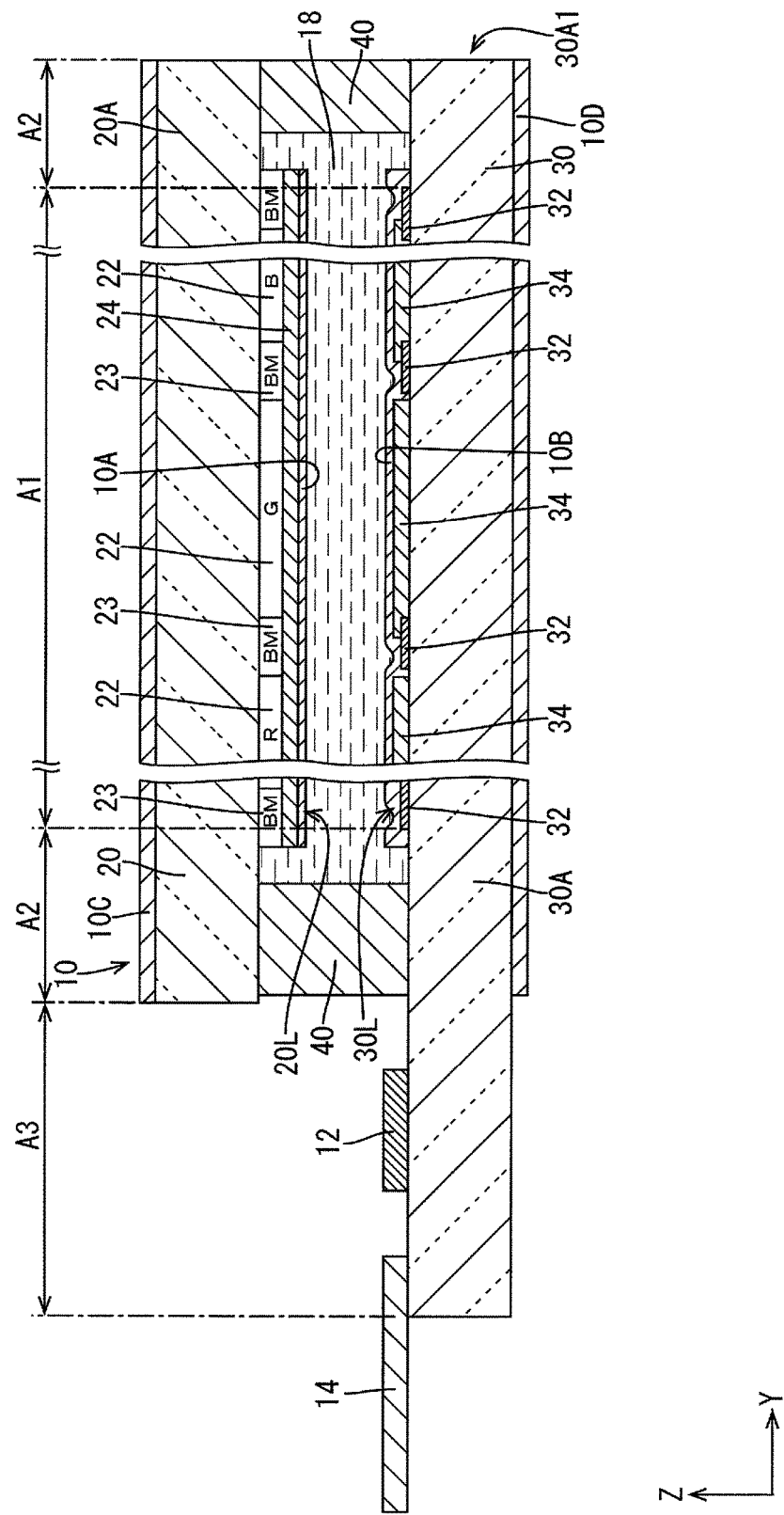
FIG. 2 is a schematic cross-sectional view of the liquid crystal panel illustrating a cross-sectional configuration taken along line II-II in FIG. 1.

As illustrated in FIGS. 1 and 2, the liquid crystal panel 10 includes a pair of glass substrates 20 and 30 having high transmissivity, and a liquid crystal layer 18 including liquid crystal molecules having optical characteristics that vary according to application of electric field. The substrates 20 and 30 of the liquid crystal panel 10 are bonded together with an ultraviolet cure sealing agent portion 40 with a cell gap of a thickness of the liquid crystal layer 18 therebetween. The substrates 20 and 30 of the liquid crystal panel 10 include a color filter substrate 20 on the front (on a front surface side) and an array substrate 30 on a back side (on a rear surface side). Alignment films 10A and 10B are formed on inner surfaces of the substrates 20 and 30, respectively, for aligning the liquid crystal molecules included in the liquid crystal layer 18. Polarizing plates 10C and 10D are bonded to outer surfaces of a first glass substrate (one example of substrates) 20A and a second glass substrate (one example of the substrates) 30A of the substrates 20, 30, respectively.

The first glass substrate 20A of the color filter substrate 20 has a thickness of 700 μm for example, and the array substrate 30 and the polarizing plate 10C are bonded to a main portion of the first glass substrate 20A. As illustrated in FIG. 1, the color filter substrate 20 has an X-axis dimension substantially same as that of the array substrate 30 and has a Y-axis dimension smaller than that of the array substrate 30. The color filter substrate 20 and the array substrate 30 are bonded together such that respective ones of the Y-axis edges (upper-side edges in FIG. 1, having arched outline portions) thereof are aligned with each other. According to such a configuration, the color filter substrate 20 is not overlapped with a portion of the array substrate 30 in another one of the Y-axis edges (a lower-side edge in FIG. 1) over a certain area and the edge portion of the array substrate 30 is exposed outside on the front and rear plate surfaces thereof. Thus, a mounting area A3 where IC chip 12 and the flexible printed circuit board 14 are mounted is provided in the exposed portion.

The second glass substrate 30A of the array substrate 30 has a thickness of 700 μm for example, and the color filter substrate 20 and the polarizing plate 10D are bonded to a main portion of the second glass substrate 30A of the array substrate 30 and a portion of the array substrate 30 for the mounting area A3 where the IC chip 12 and the flexible printed circuit board 14 are mounted is not overlapped with the color filter substrate 20 and the polarizing plate 10D. The sealing agent portion 40 for bonding the substrates 20 and 30 of the liquid crystal panel 10 is disposed within the non-display area A2 of an overlapped portion where the substrates 20 and 30 are overlapped with each other. The sealing agent portion 40 is disposed to surround the splay area A1 along the outline of the color filter substrate 20 (see FIG. 2).

Layered thin film patterns are formed on the inner surface side (the liquid crystal layer 18 side) of the second glass substrate 30A of the array substrate 30. Specifically, the thin film patterns of TFTs 32 that are switching components and thin film patterns of pixel electrodes 34 that are transparent conductive films such as indium tin oxide (ITO) and connected to the TFTs 32 are arranged in a matrix on the inner surface of the second glass substrate 30A of the array substrate 30. Furthermore, gate lines, source lines and capacitance lines (not illustrated) are arranged to surround the TFTs 32 and the pixel electrodes 34 on the array substrate 30. Terminals extended from each of the gate lines and the capacitance lines and terminals extended from the source lines are connected to the edge portion of the array substrate 30. Signals or reference potential is input from a control board 16 illustrated in FIG. 1 to each of the terminals and driving of the TFTs 32 is controlled.

As illustrated in FIG. 2, color filters 22 are arranged on the inner surface side (the liquid crystal layer 18 side) of the first glass substrate 20A of the color filter substrate 20. The color filters 22 are arranged in a matrix while overlapping the respective pixel electrodes 34 of the array substrate 30 in a plan view. The color filters 22 include red (R), green (G), and blue (B) color portions. A light blocking portion (black matrix) 23 is formed between the color portions included in the color filters 22 for reducing color mixture. The light blocking portion 23 is arranged to overlap the gate line, the source lines, and the capacitance lines in a plan view. In the liquid crystal panel 10, the R (red) color portion, the G (green) color portion, the B (blue) color portion, and three pixel electrodes 34 opposed to the respective color portions form a display pixel that is a display unit. Each display pixel includes a red pixel including the R color portion, a green pixel including the G color portion, and a blue pixel including the B color portion. The color pixels are repeatedly arranged along a row direction (the X-axis direction) on a plate surface of the liquid crystal panel 10 to form a pixel group. The pixel groups are arranged along the column direction (the Y-axis direction).

Figure 3:
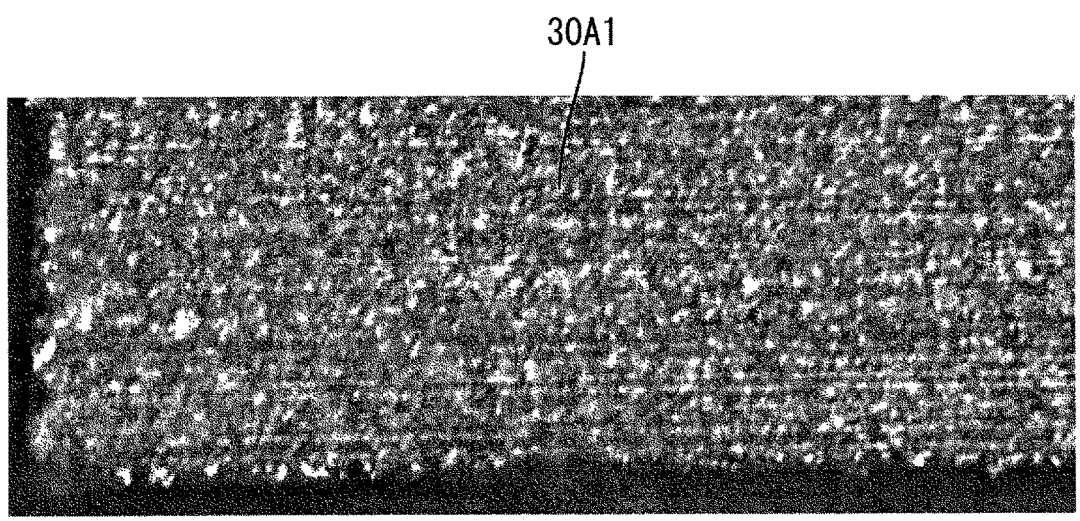
FIG. 3 is a photo illustrating a processed cut surface of a glass substrate that is ground by a grinder.

As illustrated in FIG. 3, a counter electrode 24 is disposed on inner surfaces of the color filter 22 and the light blocking portion 23 to be opposed to the pixel electrodes 34 on the array substrate 30 side. Counter electrode lines, which are not illustrated, are arranged in the non-display area of the liquid crystal panel 10. The counter electrode lines are connected to the counter electrode 24 via a contact hole. Reference potential is applied to the counter electrode 24 from the counter electrode lines and the potential to be applied to the pixel electrodes 34 is controlled by the TFTs 32 to produce potential difference between the pixel electrodes 34 and the counter electrode 24.

As illustrated in FIG. 2, on an edge surface of the liquid crystal panel 10 of this embodiment having a linear outline (a left side edge surface in FIG. 2, hereinafter referred to as a linear edge surface), the pair of glass substrates 20A, 30A extends slightly further toward outside the sealing agent portion 40. On the edge surface (an edge surface on the right side in FIG. 2, hereinafter referred to as a curved edge surface) having a curved outline shape, the edge surfaces of the glass substrates 20A and 30A are aligned with an edge surface of the sealing agent portion 40. As illustrated in FIG. 2, a width dimension of the sealing agent portion 40 on the curved edge surface (a Y-axis dimension) is smaller than a width dimension of the sealing agent portion 40 on the linear edge surface. The liquid crystal panel 10 has a frame width of the frame portion on the curved edge surface (a width of the non-display area A2 illustrated on the left side in FIG. 2) and the frame width is 700 μm or less and a frame having a small width dimension is achieved.

Figure 5:
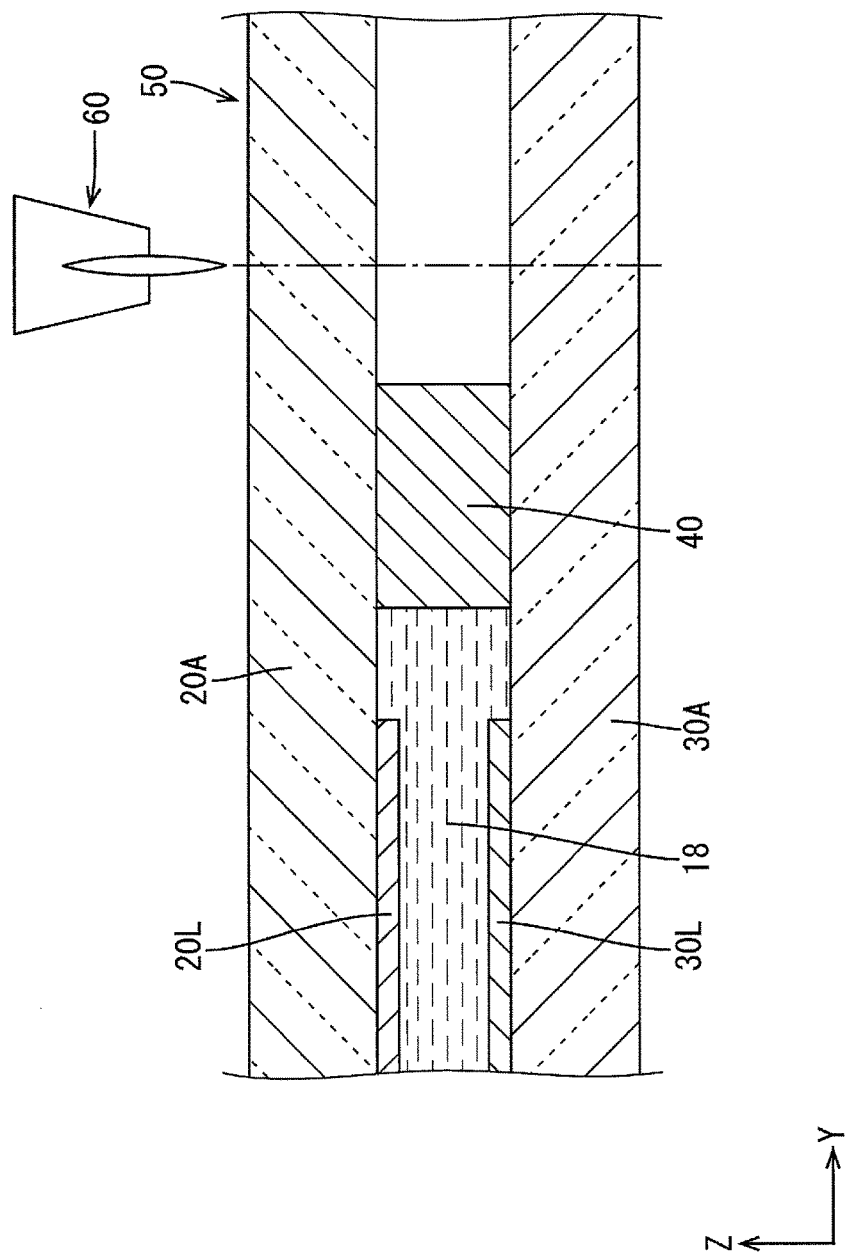
FIG. 5 is a cross-sectional view illustrating a cutting process of cutting a curved edge surface.

As will be described later, the curved edge surface is formed with a grinding process in which the glass substrates 20A, 30B and the sealing agent portions 40 are collectively ground with a grinder and with such a method, the glass substrates 20A, 30A and the sealing agent portions 40 have the above configuration at the curved edge surface of the liquid crystal panel 10. Therefore, as illustrated in FIG. 3, the second glass substrate 30A has a cut surface of a processed surface 30A at the curved edge surface is a frosted glass surface (same as a cut surface of a processed surface of the first glass substrate 20A). The liquid crystal panel 10 has the above-described configuration. Hereinafter, the configuration formed on the first glass substrate 20A except for the alignment film 10A is referred to as a CF layer (an example of a thin film pattern) 20L and the configuration formed on the second glass substrate 30A except for the alignment film 10B is referred to as a TFT layer (an example of a thin film pattern) 30L. In FIG. 5 and the subsequent drawings, the alignment films 10A, 10B and the polarizing plates 10C, 10D are not illustrated.

A method of producing the liquid crystal panel 10 having the above configuration will be described. The first glass substrate 20A to be the color filter 20 and the second lass substrate 30A to be the array substrate 30 are prepared. The CF layers 20L are formed on one plate surface of the first glass substrate 20A and the TFT layers 30L are formed on one plate surface of the second glass substrate 30A. The CF layers 20L and the TFT layers 30L are formed on the first glass substrate 20A and the second glass substrate 30A, respectively, with a known photolithography method. The first glass substrate 20A and the second glass substrate 30A are transferred through a film forming device, a resist coating device, and an exposure device used with the photolithography method such that thin films for the CF layers 20L and the TFT layers 30L are layered sequentially in a predefined pattern.

In the producing method according to this embodiment, a bonded substrate 50 obtained by bonding the first glass substrate 20A and the second glass substrate 30A is cut to obtain separated bonded substrates in processes described below. Thereafter, each of the separated bonded substrates is ground and six liquid crystal panels 10 are produced from one bonded substrate 50. Namely, the CF layer 20L is formed on each of six portions of the first glass substrate 20A and the TFT layer 30L is formed on each of six portions of the second glass substrate 30A (see FIG. 4). The CF layers 20L and the TFT layers 30L are formed on the respective glass substrates 20A and 30A such that each of the CF layers 20L and each of the TFT layers 30L are opposite each other when bonding the glass substrates 20A and 30A.

Figure 4:
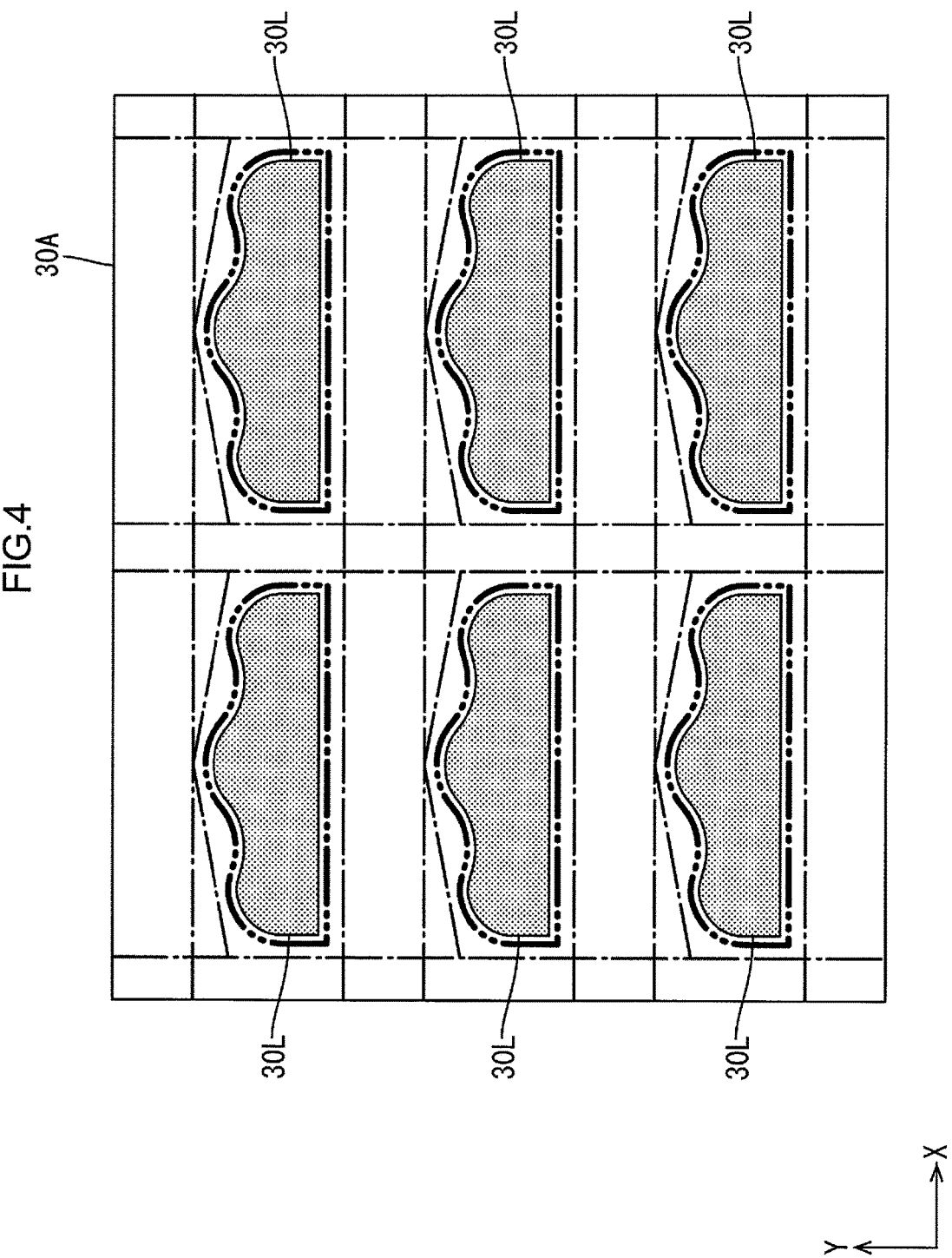
FIG. 4 is a plan view illustrating a seal ng agent disposing process.

Next, the alignment films 10A are disposed on the first glass substrate 20A to cover each of the CF layers 20L formed on the first glass substrate 20A, and the alignment films 10B are disposed on the second glass substrate 30A to cover each of the TFT layers 30L formed on the second glass substrate 30A. According to the above sequence, six color filter substrates 20 are formed on the first glass substrate 20A and six array substrates 30 are formed on the second glass substrate 30A. Next, the sealing agent portions 40 are disposed on the second glass substrate 30A to surround each of the TFT layers 30L on the second glass substrate 30A (a sealing agent disposing process). Thick two-dot chain lines in FIG. 4 illustrate portions of the second glass substrate 30A where the sealing agent portions 40 are disposed. In the sealing agent disposing process, as illustrated in FIG. 4, the sealing agent portion 40 is disposed alone the outline of each of the liquid crystal panels 10 to be produced and disposed over a predefined width (for example, 700 μm that is same as the thickness of the second glass substrate 30A).

Next, the first glass substrate 20A and the second glass substrate 30A are positioned with each other such that the CF layers 20L formed on the first glass substrate 20A are opposite the TFT layers 30L formed on the second glass substrate 30A, respectively. Liquid crystals are dripped in areas surrounded by the sealing agent portions 40 on the second glass substrate 30A with the one drop fill (ODF) method using a liquid crystals dripping device. Then, the glass substrates 20A and 30A are bonded with the sealing agent portions 40 and the bonded substrate 50 is obtained (a bonding process). The bonding process is performed while the sealing agent portions 40 are irradiated with ultraviolet rays and heated. Accordingly, the sealing agent portions 40 are cured and the glass substrates 20A and 30A are fixed to each other with the sealing agent portions 40. By the bonding of the glass substrates 20A and 30A, the dripped liquid crystals spread along a plate surface of the second glass substrate 30A and the areas surrounded by the sealing agent portions 40 are filled with the liquid crystals. Thus, the liquid crystal layers 18 are formed between the glass substrates 20A and 30A.

Figure 6:
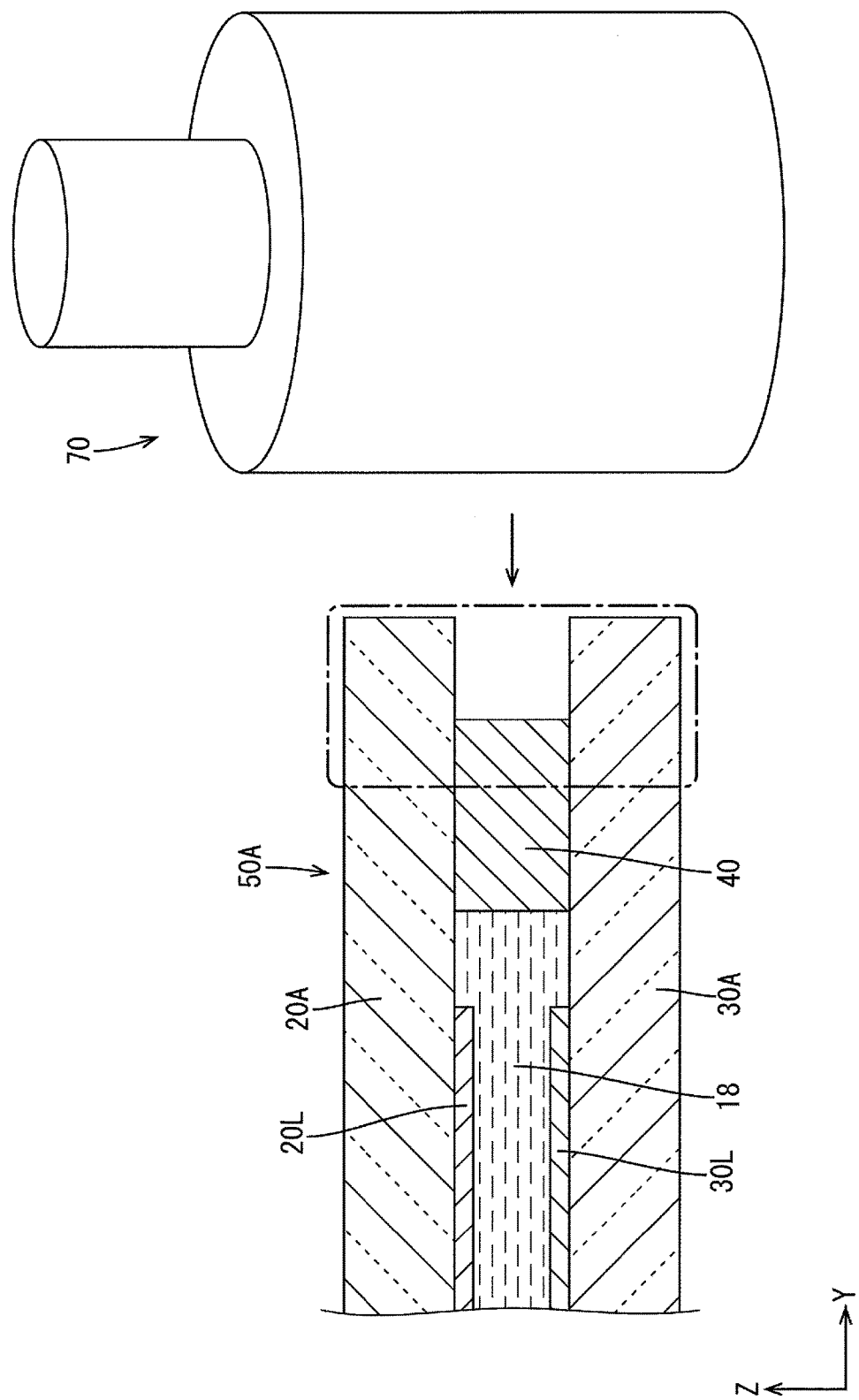
FIG. 6 is a cross-sectional view illustrating a grinding process (1) of grinding the curved edge surface.
Figure 7:
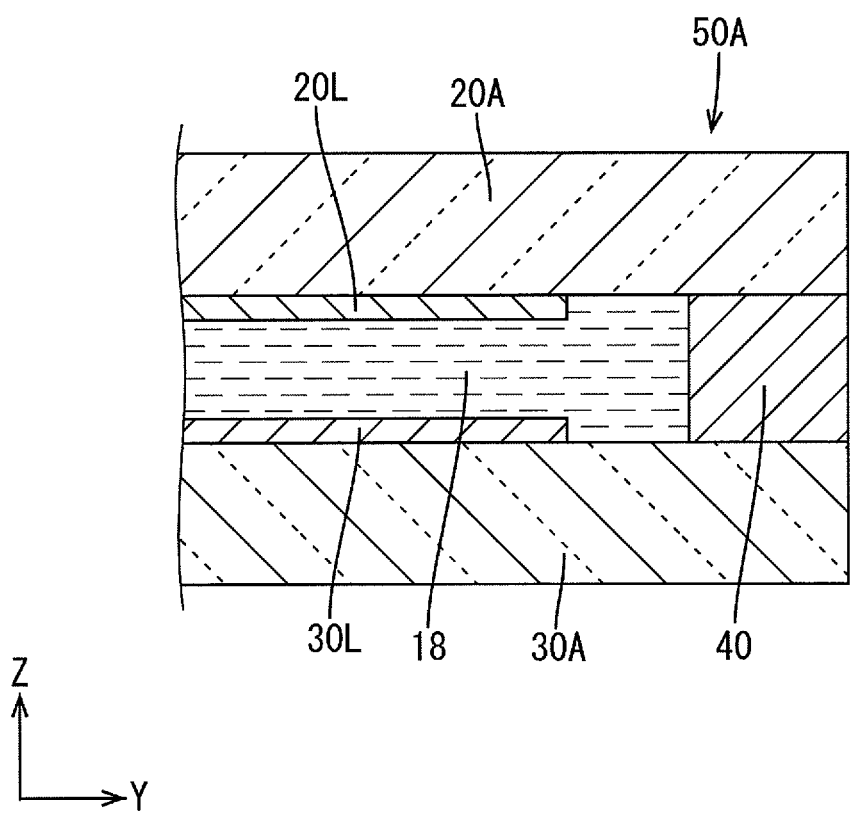
FIG. 7 is a cross-sectional view illustrating a grinding process of grinding the curved edge surface.
Figure 8:
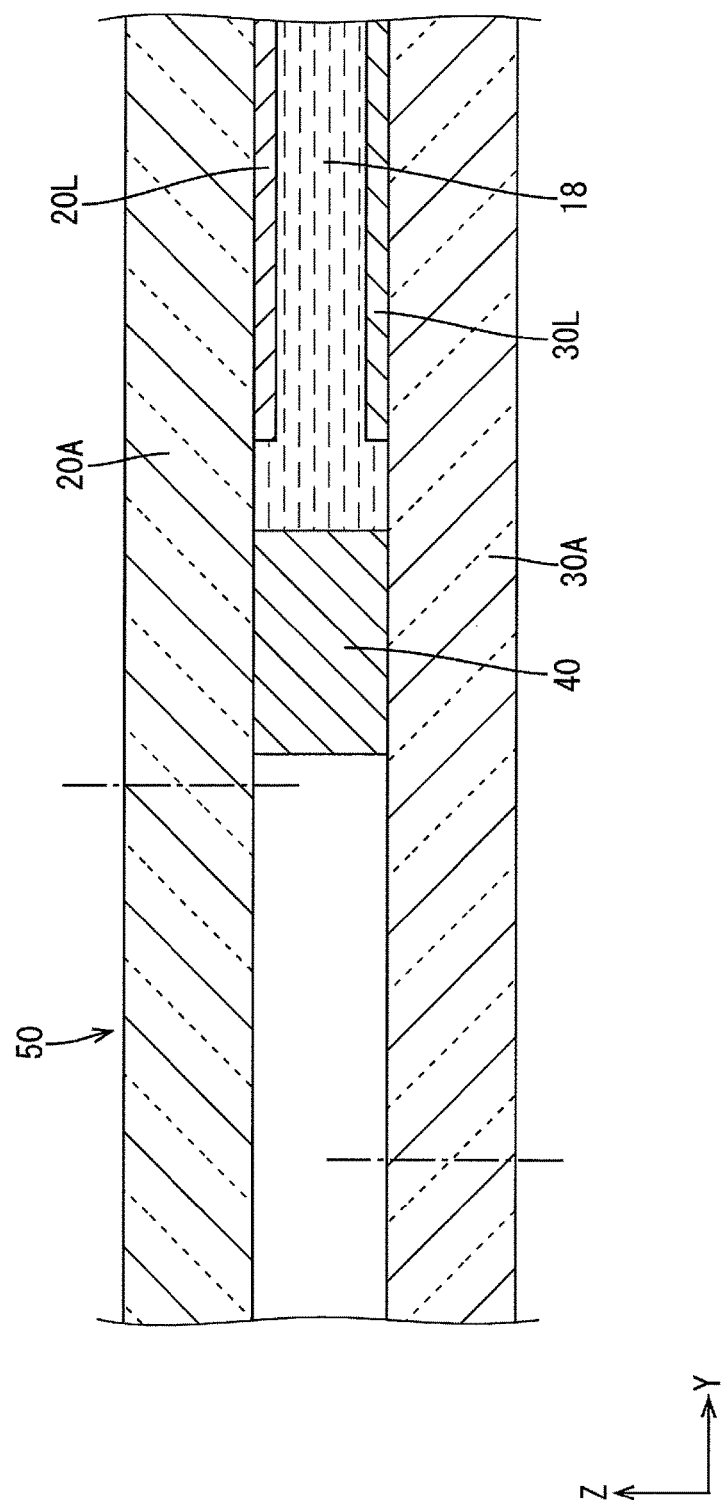
FIG. 8 is a cross-sectional view illustrating a cutting process (1) of cutting a linear edge surface.
Figure 9:
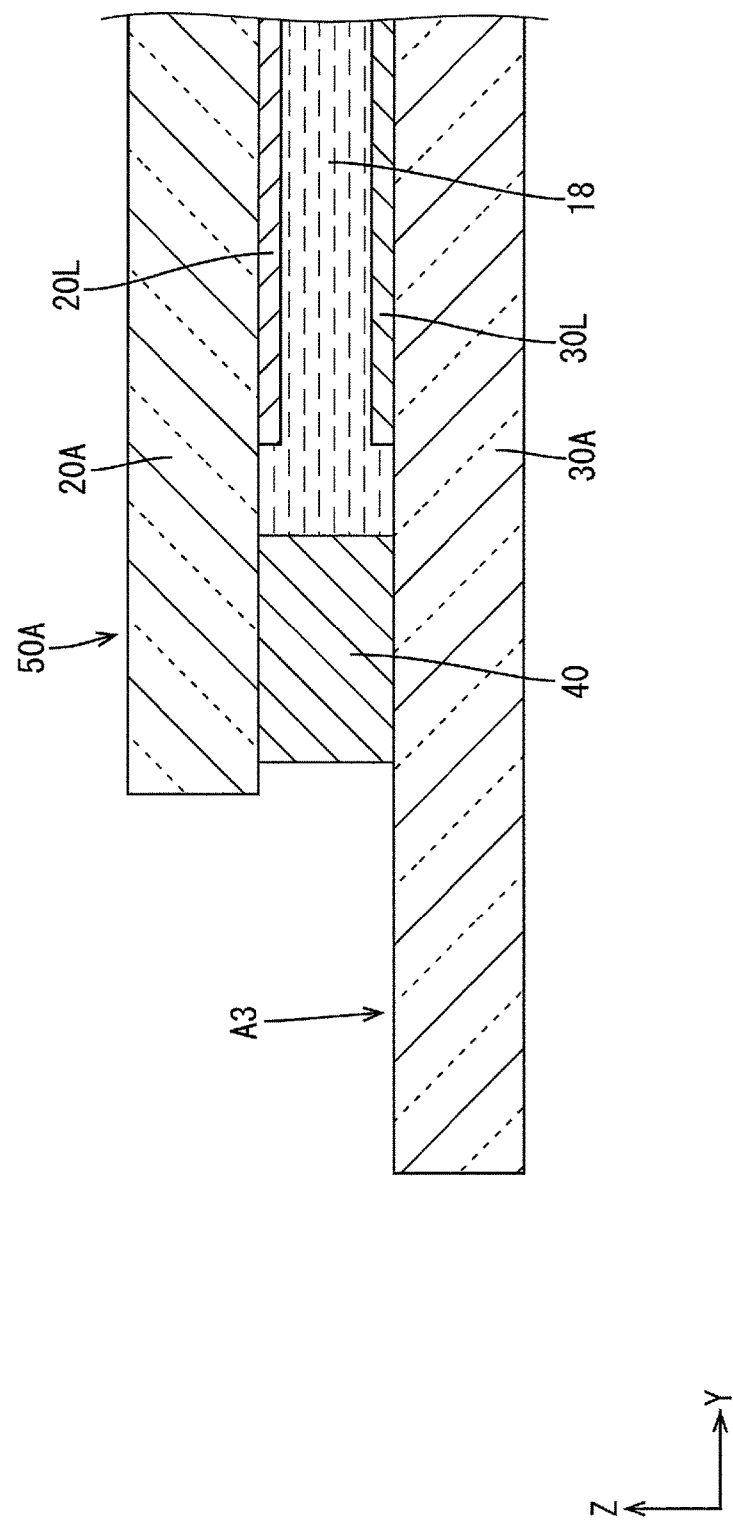
FIG. 9 is a cross-sectional view illustrating a cutting process (2) of cutting the linear edge surface.

Next, one bonded substrate 50 is briefly cut into six pieces to correspond with an outline of each of the six liquid crystal panels 10 to be produced (a cutting process). Thin dot-and-dash lines in FIG. 4 illustrate cutting lines on the second glass substrate 30A along which the substrate is to be cut in the cutting process. In the cutting process, the glass substrates 20A and 30A in a pair of the bonded substrate 50 that are positioned outside the sealing agent portions 40 each surrounding the CF layer 20L and the TFT layer 30L in a plan view are cut along the dot-and-dash lines in FIG. 4 with using a dicing saw 60 (see FIG. 5). FIGS. 5 to 7 illustrate cross-sectional views of a portion of the liquid crystal panel 10 to be produced near the curved edge surface, that is, a portion of the liquid crystal panel 10 near a right side edge surface in FIG. 2. FIGS. 8 and 9 illustrate cross-sectional views of a portion of the liquid crystal panel 10 to be produced near the straight edge surface, that is, a portion near a left side edge surface in FIG. 2.

Dot-and-dash lines in FIGS. 5 and 8 illustrate cutting lines of the glass substrates 20A, 30A along which the glass substrates are cut in the cutting process. As illustrated in FIG. 5, in the cutting process, the glass substrates 20A, 30A in a pair of the bonded substrate 50 are cut for forming the curved edge surfaces such that cut surfaces of the glass substrates 20A, 30A are aligned with each other. As illustrated in FIG. 8, the glass substrates 20A, 30A are cut for forming the straight edge surfaces such that a cut surface of the first glass substrate 20A is not aligned with a cut surface of the second glass substrate 30A. Specifically, the glass substrates 20A, 30A are cut along an outline of the mounting area A3 such that the cut surface of the second glass substrate 30A is further away from the sealing agent portion 40 than the cut surface of the first glass substrate 20A is. Accordingly, the second glass substrate 30A includes an area in which the second glass substrate 30A does not overlap the first glass substrate 20A over a certain range and the area is the mounting area A3 of the liquid crystal panel 10 to be produced. Hereinafter, separated bonded substrates obtained from the bonded substrate 50 in the cutting process are referred to as separated bonded substrates 50A.

Next, the curved edge surface of each separated bonded substrate 50A is ground with a grinder 70 (a grinding process). The grinder 70 is a device of rotating a grinding wheel for grinding an object to be processed. A portion surrounded by a dot-and-dash line in FIG. 6 is a portion of the separated bonded substrate 50A that is to be ground in the grinding process. As illustrated in FIG. 6, on the curved edge surface of the separated bonded substrate 50A after the cutting process, the glass substrates 20A, 30A in a pair projects outward slightly than the sealing agent portion 40. There, in a former step of the grinding process, the glass substrates 20A, 30A are around by the grinder 70. If the grinder 70 reaches the sealing agent portion 40, the pair of glass substrates 20A, 30A and the sealing agent portion 40 are collectively ground along the outline of the liquid crystal panel 10 to be produced such that ground surfaces of the glass substrates 20A, 30A and the ground surface of the sealing agent portion 40 are aligned with each other. The linear edge surface is not subjected to the grinding process.

In the grinding process, the grinding operation is performed until the width dimension of the sealing agent portion 40 is effectively small (for example from 200 µm to 500 µm). Then, at the curved edge surface of the liquid crystal panel 10 to be produced, the width dimension of the sealing agent portion 40 is reduced and the frame width of the liquid crystal panel 10 is reduced. In the grinding process, the grinding operation is performed along the outline of the liquid crystal panel 10 to be produced such that the plan view outline of the processed curved edge surface after the grinding process is curved. The curved edge surface is processed with grinding with the grinder 70 and therefore, cracks are less likely to be unintentionally generated near the curved edge surface and the curved edge surface can be processed with high precision. Then, the polarizing plates 10C, 10D are bonded to the outer surfaces of the glass substrates 20A and 30A included in each bonded substrate, and six liquid crystal panels 10 according to this embodiment are obtained.

As described before, according to the method of producing the liquid crystal panels 10 of this embodiment, in the cutting process, the glass substrates 20A and 30A that are outside each sealing agent portion 40 surrounding the CF layer 20L and the TFT layer 30L of the bonded substrate 50 are cut. Thus, the bonded substrate 50 is briefly cut along the outline of the liquid crystal panel to be produced. Therefore, in the cutting process, the bonded substrate 50 is cut along a substantially straight line near the curved edge surface and cracks that are different from desired cutting lines are less likely to be generated. If cracks different from the desired cutting lines are generated, the cutting lines are away from the portion to be the outline portion and therefore, the cracks are less likely to adversely affect the shape accuracy of the liquid crystal panel 10.

According to the producing method of the present embodiment, in the grinding process, the glass substrates 20A, 30A in a pair and the sealing agent portion are collectively ground to form the curved edge surface. Therefore, undesired cracks are less likely to be generated near the curved edge surface. The glass substrates 20A, 30A in a pair and the sealing agent portion 40 are collectively ground along the outline of the liquid crystal panel 10 such that the ground surfaces of the glass substrates 20A, 30A and the ground surface of the sealing agent portion are aligned with each other. Thus, the curved outline forming an outer shape of the liquid crystal panel is formed with high precision. In the grinding process, the glass substrates 20A, 30A in a pair and the sealing agent portion 40 are collectively ground such that the ground surfaces of the glass substrates 20A, 30A and the ground surface of the sealing agent portion 40 are aligned with each other. Accordingly, the width dimension (a dimension in the Y-axis direction) of the sealing agent portion 40 after the grinding process is reduced and the frame width of the liquid crystal panel 10 is reduced. According to the method of producing the liquid crystal panels 10 of the present embodiment, the liquid crystal panels each having a curved outline can be produced with high precision while reducing a width of a frame portion.

According to the producing method of the present embodiment, in the seal agent disposing process, the sealing agent portion 40 is disposed along the outline of the liquid crystal panel 10 with a predetermined width. If the width dimension of the sealing agent portion 40 disposed on the second glass substrate 30A is reduced at most to reduce the width dimension of the frame portion of the liquid crystal panel 10, the bonded substrate 50 may not have effective bonding strength. As a result, separation may be caused in the bonded substrate 50 in the cutting process and producing yield of the liquid crystal panels 10 may be lowered.

According to the producing method of this embodiment, in the sealing agent disposing process, the sealing agent portion 40 is disposed with a width dimension (such as 700 μm) such that the bonded substrate 50 after the forming of the bonding substrate 50 has effective bonding strength. Thus, the separation is less likely to be caused in the bonded substrate 50 in the cutting process. The sealing agent portion 40 is disposed along the outline of the liquid crystal panel 10 and the glass substrates 20A, 30A and the sealing agent portion 40 are collectively ground along the outline of the liquid crystal panel 10 with keeping the bonding strength that restricts the separation in the bonded substrate 50 in the grinding process. As a result, producing yield is less likely to be lowered in the producing process of the liquid crystal panels 10.

According to the producing method of this embodiment, in the cutting process, an edge surface portion of the mounting area A3 having the linear plan view outline is cut straight along the outline of the liquid crystal panel 10. Accordingly, the edge surface of the mounting area A3 of the liquid crystal panel 10 is formed while cracks that are different from the desired cutting lines are less likely to be generated. In the mounting area A3, the edge surface of the liquid crystal panel 10 is formed without performing the grinding process and therefore, the process of producing the liquid crystal panel 10 is simplified.

According to the producing method of this embodiment, in the cutting process, the bonded substrate 50 is cut into six pieces such that the bonded substrate 50 is separated into six separated bonded substrates, and each of the separated bonded substrates 50 separated in the cutting process is subjected to the grinding process. Therefore, the six liquid crystal panels 10 having curved outlines are collectively produced with high precision.

Modification of First Embodiment

Figure 10:
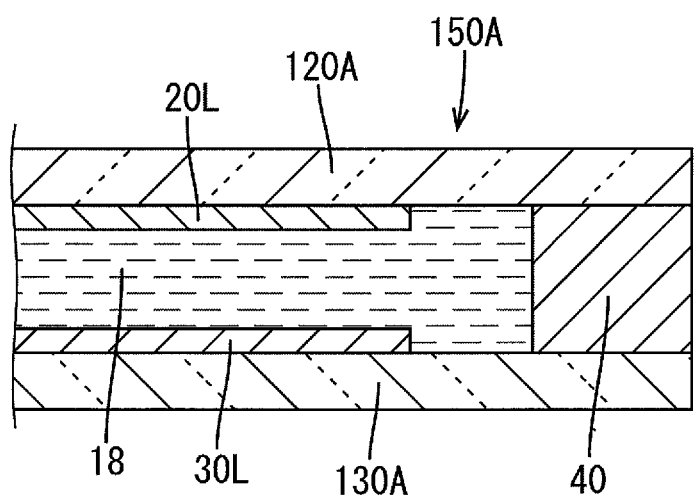
FIG. 10 is a perspective view illustrating a part of a liquid crystal panel according to a modification of the first embodiment.

A modification of the first embodiment will be described with reference to FIG. 10. In this modification, as illustrated in FIG. 10, a thickness of a first glass substrate 120A of the color filter substrate and a thickness of a second glass substrate 130A of the array substrate are smaller than those of the first embodiment, respectively. Specifically, the thickness of each of the substrates 120A, 130A is 150 μm. In such a configuration that the glass substrates 120A, 130A are thin, the glass substrates 120A, 130A and the sealing agent portion 40 that have curved edge surfaces are collectively ground in the grinding process and the width dimension of the sealing agent portion can be reduced (for example, from 200 μm to 500 μm). As a result, the width of the frame portion at the curved edge surface can be 1 mm or less and the frame width of the liquid crystal panel to be produced can be reduced.

Second Embodiment

Figure 11:
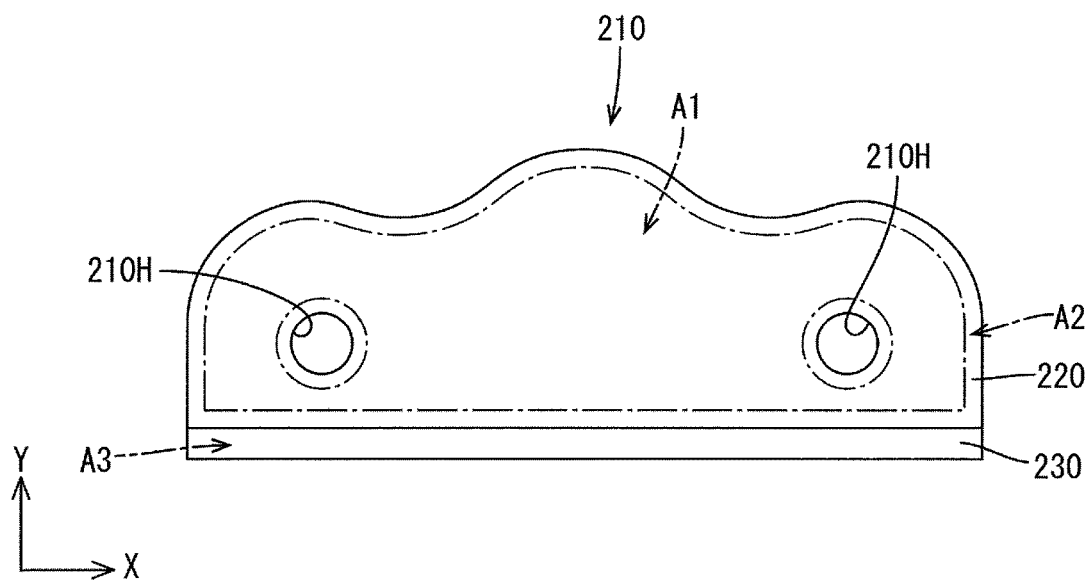
FIG. 11 is a plan view of a liquid crystal panel according to a second embodiment.

A second embodiment will be described with reference to FIG. 11. A liquid crystal panel 210 of this embodiment has an outline similar to that of the first embodiment as illustrated in FIG. 11. The liquid crystal panel 210 includes through holes 210H on both sides with respect to the X-axis direction in a display area A1 and the through holes are through a thickness of the liquid crystal panel 210. In FIG. 11, portions illustrated with reference numerals which 200 is added to the reference numerals in FIG. 1 are same as those in the first embodiment.

The liquid crystal panel 210 of this embodiment having the above shape is produced as described below. In the sealing agent portion disposing process, the sealing agent portion is further disposed at least around a portion of a plate surface of one of the glass substrates where the through hole 210H is to be formed. Then, a preliminary through hole forming process is performed and in the preliminary through hole forming process, a preliminary through hole having a diameter smaller than that of the through hole 210H is formed in each of the portions of the bonded substrate where the through holes 210H are to be formed. Then, in the grinding process, the glass substrates in a pair and the sealing agent portion at an opening edge surface of each preliminary through hole are collectively ground to enlarge a diameter of each preliminary through hole and each through hole 210H is formed. Other processes are same as those in the first embodiment. According to the producing method of this embodiment having the above sequence, in the grinding process, the glass substrates in a pair and the sealing agent portion are collectively ground to increase the diameter of the preliminary through hole. Thus, the through hole having a desired diameter can be formed while restricting generation of cracks that are not desired lines.

Third Embodiment

Figure 12:
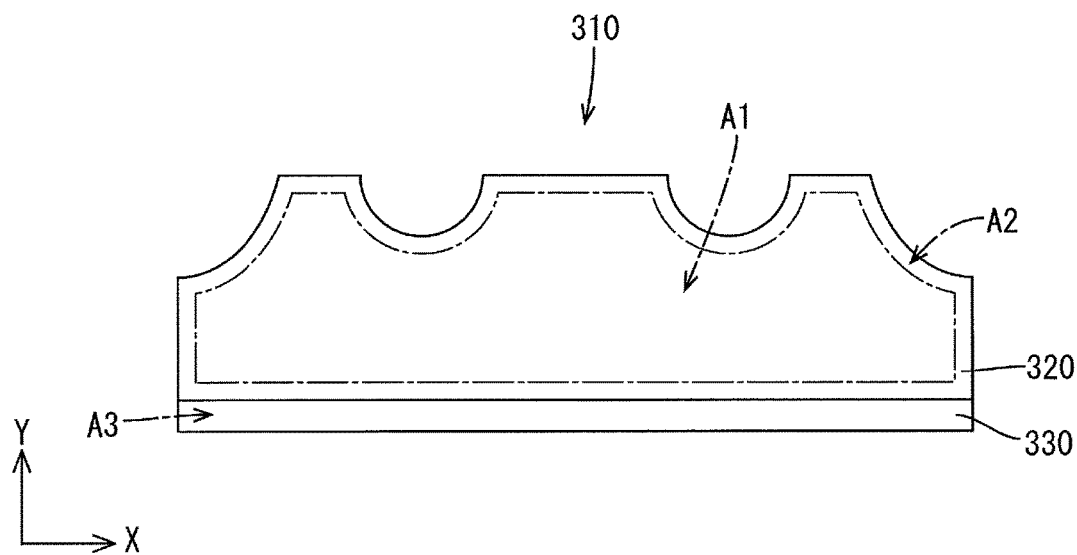
FIG. 12 is a perspective view of a liquid crystal panel according to a third embodiment.

A third embodiment will be described with reference to FIG. 12. A liquid crystal panel 310 of this embodiment has an outline a part of which is curved. Specifically, as illustrated in FIG. 12, the liquid crystal panel 310 has a laterally elongated display area A1 and the display area A1 has a shape as described below. Multiple portions of the laterally elongated rectangular outline are cut off in an arched shape. In FIG. 12, portions illustrated with reference numerals which 300 is added to the reference numerals in FIG. 1 are same as those in the first embodiment.

In the liquid crystal panel 310 having the above outline shape according to this embodiment, a portion having a plan view straight outline at an edge surface of the display area A1 is cut along a substantially straight line along the outline of the liquid crystal panel 310 in the cutting process of the producing process. Thus, cracks that are different from the desired cutting lines are less likely to be generated and the edge surface can be formed without performing the grinding process. Therefore, the producing process of the liquid crystal panel 310 can be simplified.

Fourth Embodiment

Figure 13:
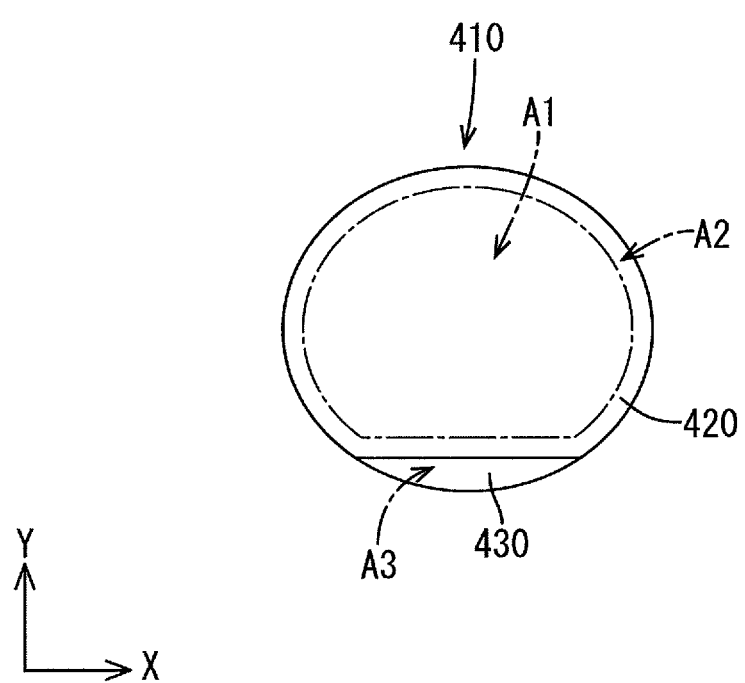
FIG. 13 is a perspective view of a liquid crystal panel according to a fourth embodiment.
Figure 14:
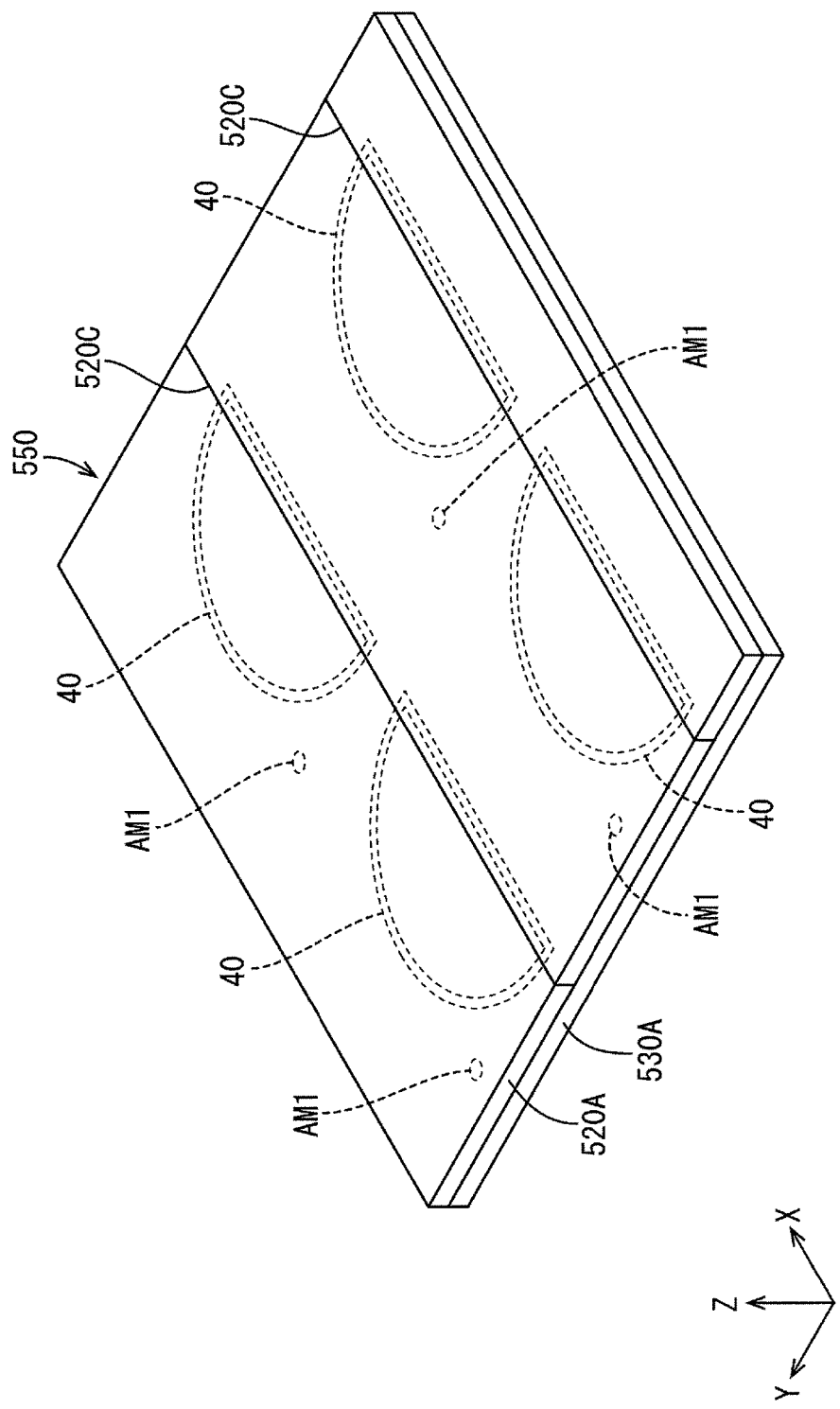
FIG. 14 is a perspective view illustrating a process (1) of producing liquid crystal panels according to a fifth embodiment.

A fourth embodiment will be described with reference to FIG. 13. As illustrated in FIG. 13, the liquid crystal panel 410 described in this embodiment has a substantially plan view circular outline and the entire outline is curved. Therefore, a mounting area A3 has an outline a part of which is curved. In FIG. 3, portions illustrated with reference numerals which 400 is added to the reference numerals in FIG. 1 are same as those in the first embodiment.

The liquid crystal panel 410 having the above shape according to this embodiment is produced by grinding entire area of the edge surface of the bonded substrate in the grinding process. Therefore, the curved outline of the liquid crystal panel 410 is formed over an entire area of the edge surface of the bonded substrate while keeping the mounting area A3 for the IC chip.

Fifth Embodiment

A fifth embodiment will be described with reference to FIGS. 14 to 19. In this embodiment, in a liquid crystal panel having a semicircular plan view outline shape, a method of collectively producing liquid crystal panels (specifically, twenty eight liquid crystal panels) will be described. In the liquid crystal panel of this embodiment, the semicircular plan view outline shape has a linear portion that is a part of an outline of the mounting area A3 (see FIG. 19). In the method of producing the liquid crystal panel of this embodiment, the CF layers in multiples of four are formed on a first glass substrate 520A and the TFT layers in the same number of the CF layers are formed on a second glass substrate 530A to be opposite the corresponding CF layers when bonding the glass substrates 530A, 530A. In the sealing agent disposing process, the sealing agent portions 40 are disposed on the second glass substrate 530A to surround the respective TFT layers on the second glass substrate 530A along the outline of the liquid crystal panel.

Next, in the bonding process, the glass substrates 520A and 530A are positioned such that the CF layers are opposite the TFT layers 30L, respectively, with using the alignment marks AM1 (see FIG. 14) formed on the glass substrates 520A and 530A, and the glass substrates 520A and 530A are bonded to each other to form a bonded substrate before a primary cutting process. Then, a cut line 520C (see FIG. 14) is formed on a border portion between the mounting area and other area on the first glass substrate 520A. Next, a primary bonded substrate before the primary cutting process is cut such that four liquid crystal panels to be produced are included in one substrate to form the bonded substrate 550 illustrated in FIG. 14.

Figure 15:
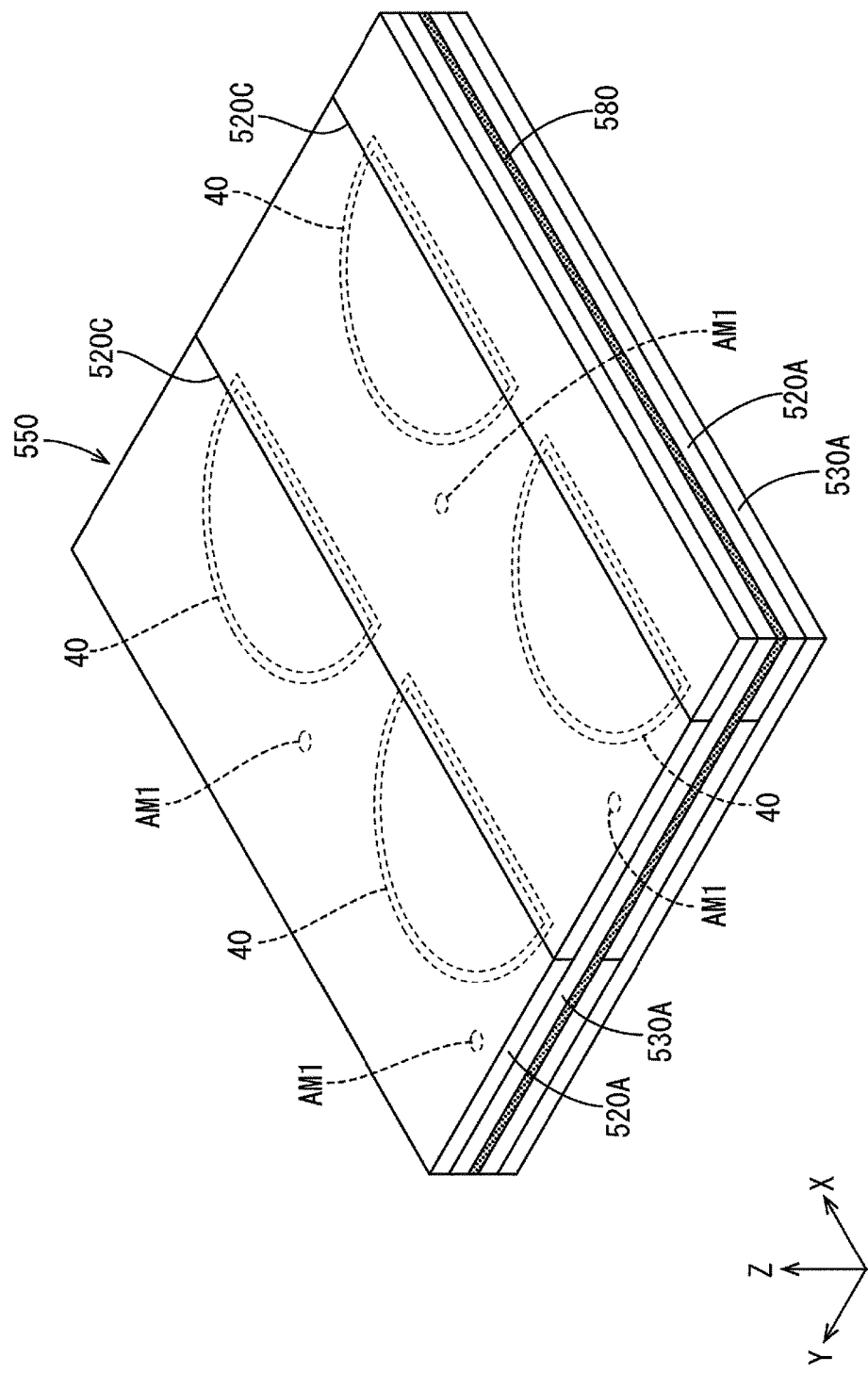
FIG. 15 is a perspective view illustrating a process (2) of producing liquid crystal panels according to the fifth embodiment.
Figure 16:
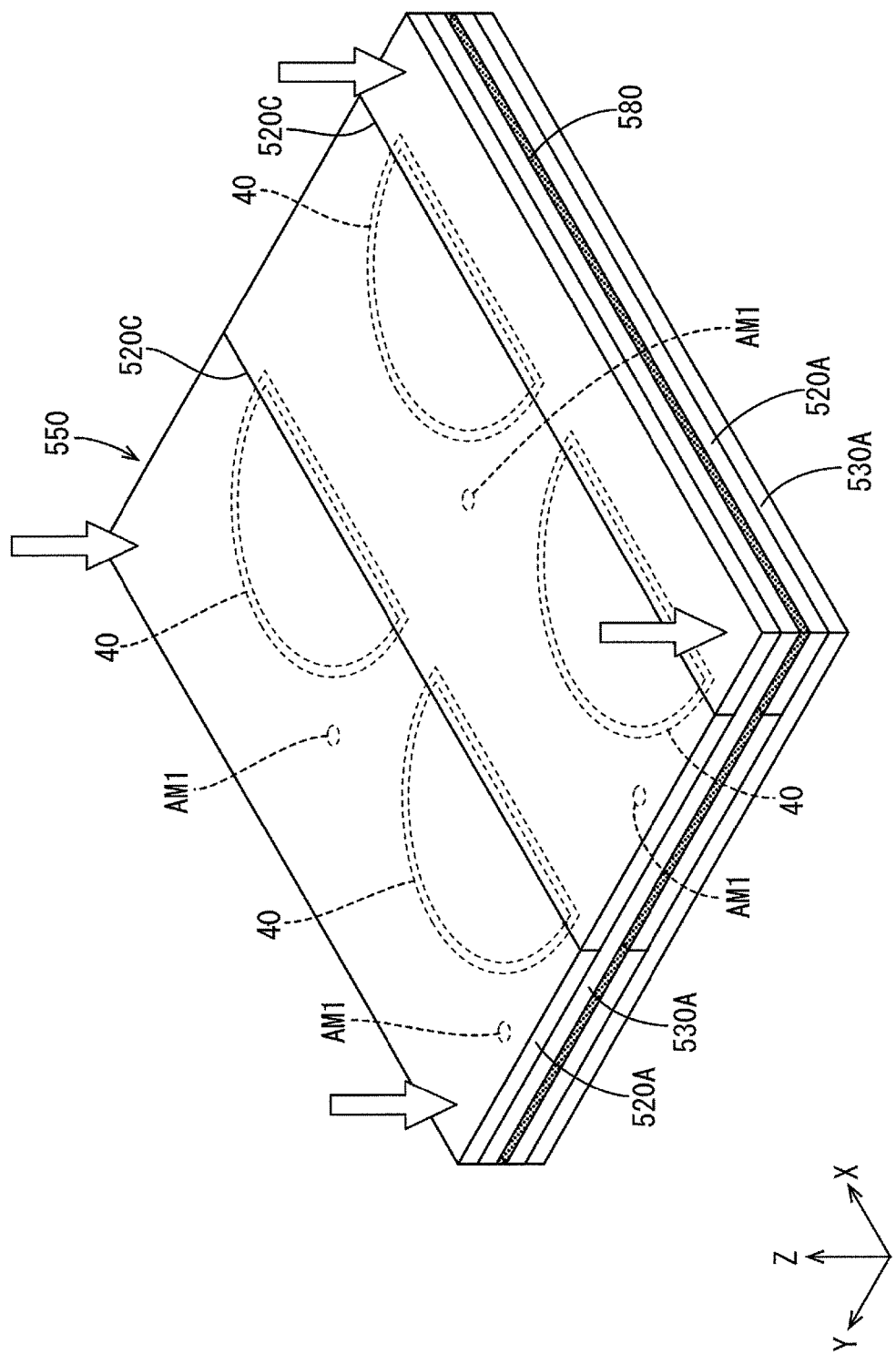
FIG. 16 is a perspective view illustrating a process (3) of producing liquid crystal panels according to the fifth embodiment.

Next, as illustrated in FIG. 15, two bonded substrates 550 are layered on each other while having photo-curable resin for layering (an example of a fixing agent) 580 therebetween (a layering process). Then, pressure is applied to one of the two bonded substrates 550 that bubbles are removed from the resin for layering 580 and extra resin is pushed out and the thickness of the resin for layering 580 is set to be constant. Then, the two bonded substrates 550 are positioned with each other again. The layering process is performed while the bonded substrates 550 are radiated with a predefined amount (for example from 5 to 500 mJ/cm$^2$) of ultraviolet rays at four corners of the bonded substrates 550 that are outside the liquid crystal panel to be produced (refer to arrows in FIG. 16). Accordingly, the resin for layering 580 is cured some extent and the glass substrates 520A and 530A are provisionally fixed to each other (a curing process).

Figure 17:
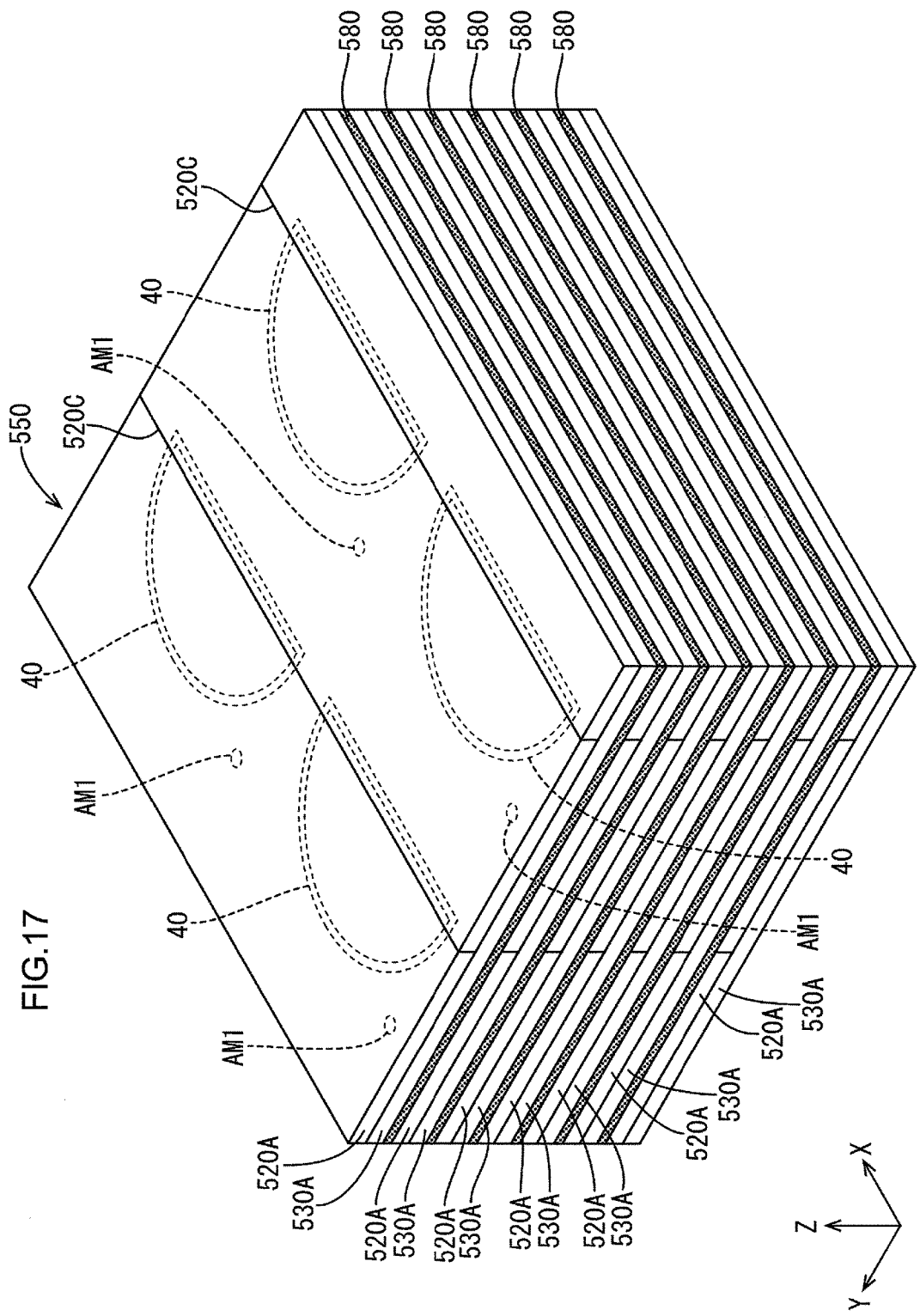
FIG. 17 is a perspective view illustrating a process (4) of producing liquid crystal panels according to the fifth embodiment.
Figure 18:
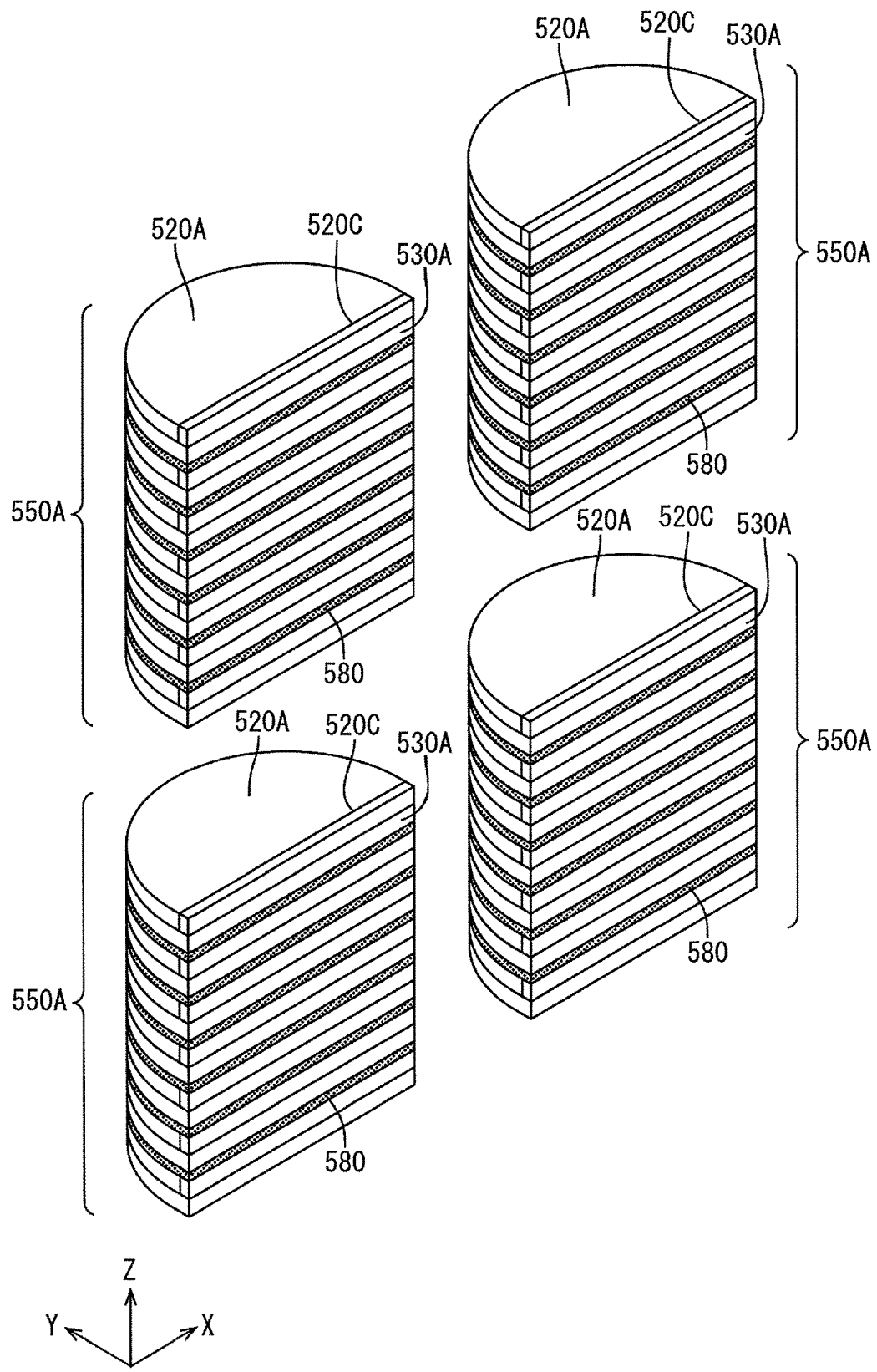
FIG. 18 is a perspective view illustrating a process (5) of producing liquid crystal panels according to the fifth embodiment.

The layering process and the provisional curing of the resin for layering 580 are performed repeatedly such that seven bonded substrates 550 are layered on each other via the resin for layering 580 as illustrated in FIG. 17. Then, the resin for layering 580 between the seven bonded substrates 550 is irradiated with ultraviolet rays and heated. Accordingly, the resin for layering 580 is cured and the bonded substrates 550 are fixed to each other via the resin for layering 580 (the curing process). Next, the layered substrate including the seven bonded substrates 550 that are layered is subjected to the cutting process and the layered substrate is cut into four pieces. In the cutting process, the bonded substrates 550 included in the layered substrate are collectively cut. Then, four separated layered substrates are subjected to the grinding process. As a result, as illustrated in FIG. 18, four separated layered substrates 550A after the grinding process (hereinafter, referred to as ground layered substrates 550A).

Figure 19:
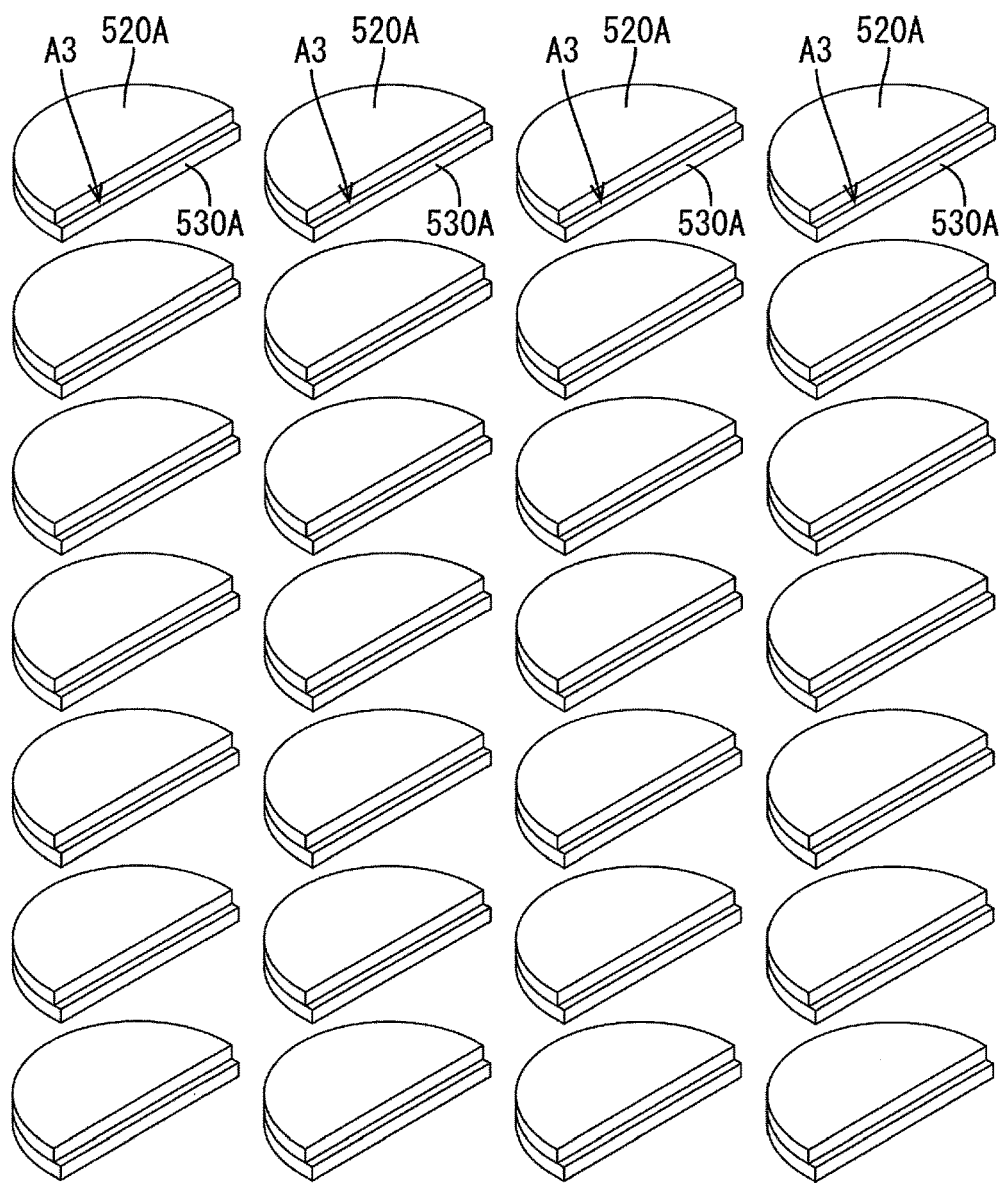
FIG. 19 is a perspective view illustrating a process (6) of producing liquid crystal panels according to the fifth embodiment.

Next, each of the tour ground layered substrates 550A are immersed in warm water (for example 85° C.) and the resin 580 for layering 580 is separated from each of the bonded substrates 550 and the ground layered substrate 550A is separated into bonded substrates after grinding process (a separation process). Then, a part of the first glass substrate 520A is removed from each separated ground bonded substrate along the cut line 520C. As a result, as illustrated in FIG. 19, twenty eight liquid crystal panels are formed from the four ground layered substrates 550A. In each of the liquid crystal panels that are produced as described before, a part of the first glass substrate 520A is removed along the cutting line 520C, and a removed portion is the mounting area A3 of the liquid crystal panel.

As described before, according to the producing method of this embodiment, in the cutting process, the bonded substrates 550 that are layered on each other are collectively cut into pieces and the bonded substrates 550 are collectively cut along the outline OIL the liquid crystal panels to be produced. Then, in the grinding process, each of the separated layered bonded substrates is ground and the bonded substrates included in each of the separated layered bonded substrates are collectively ground and the curved outline of the liquid crystal panels to be produced can be formed in one step. According to the producing method of this embodiment, the liquid crystal panels each having a curved outline are collectively produced with high precision while achieving reduction of the frame width.

Modifications of each of the above embodiments will be described below.

(1) In each of the above embodiments, the separated bonded substrate is subjected to the grinding process using the grinder in the grinding process. However, the method and the device of performing the grinding process may not be limited thereto.

(2) In each of the above embodiments, the bonded substrate is cut with using the dicing saw in the cutting process. However, the method and the device of cutting the bonded substrate may not be limited thereto.

(3) In each of the above embodiments, the liquid crystal layer is formed between the glass substrates with the ODF method. However, the method and the device of forming the liquid crystal layer between the glass substrates may not be limited thereto. For example, after the bonded substrate is formed by bonding the glass substrates, the liquid crystals may be injected into a space between the glass substrates to form the liquid crystal layer.

(4) In each of the above embodiments, the method of producing the liquid crystal panels included in the liquid crystal display device is described. However, a type of the display device including the display panel produced with the producing method of the present invention is not limited. For example, the producing method of producing an organic EL panel included in an organic EL display device is also included in the scope of the present invention.

The present invention is not limited to the embodiments, which have been described using the foregoing descriptions and the drawings. The embodiments described above are also included in the technical scope of the present invention.

EXPLANATION OF SYMBOLS

10, 210, 310, 410: liquid crystal panel, 12: IC chip, 14: flexible printed circuit board, 20, 220, 320, 420: color filter substrate, 20A, 120A, 520A: first glass substrate, 20L: CF layer, 22: color filter, 24: counter electrode, 30, 230, 330, 430: array substrate, 30A, 130A, 530A: second glass substrate, 30A1: cut surface, 30L; TFT layer, 32: TFT, 34: pixel electrode, 40: sealing agent portion, 50: bonded substrate, 50A: separated bonded substrate, 60: dicing saw, 70: grinder, 550C: cut line, 550A: bonded substrate after grinding, A1: display area, A2: non-display area, A3: mounting area, AM1: alignment mark

The invention claimed is:

1. A method of producing display panels each having an outline a part of which is curved, the method comprising:
   a sealing agent disposing process of preparing substrates in a pair one of which has thin film patterns thereon and disposing sealing agent portions on the one substrate to surround the thin film patterns, respectively;
   a bonding process of bonding the substrates in a pair via the sealing agent portions and forming a bonded substrate, the bonding process being performed after the sealing agent disposing process;
   a cutting process of cutting the substrates in a pair that are included in the bonded substrate and outside the sealing agent portions each surrounding the thin film pattern in a plan view, the cutting process being performed after the bonding process; and
   a grinding process of grinding collectively the substrates in a pair and one of the sealing agent portions that are overlapped with each other in a plan view after the cutting process such that overlapped portions of the substrates in a pair and the sealing agent portion are partially ground collectively and ground surfaces of the substrates in a pair and a ground surface of the one of the sealing agent portions are aligned with each other.

2. The method of producing the display panels according to claim 1, wherein in the sealing agent disposing process, each of the sealing agent portions is disposed along the outline of the display panel over a predefined width.

3. The method of producing the display panels according to claim 1, wherein
   each of the display panels includes a mounting area in a part of a panel surface area thereof, the mounting area where a driving component for driving the display panel is mounted, and
   in the cutting process, a portion of an edge surface of the mounting area is cut along the outline of the display panel.

4. The method of producing the display panels according to claim 1, wherein
   each of the display panels has a circular shape and includes a mounting area in a part of a panel surface area thereof, the mounting area where a driving component for driving the display panel is mounted, and
   in the grinding process, an entire area of an edge surface of the bonded substrate is subjected to the grinding process.

5. The method of producing the display panels according to claim 1, wherein
   in the sealing agent disposing process, another sealing agent portion is further disposed around a portion of a plate surface of the one substrate where a through hole is to be formed,
   the method further comprising a preliminary through hole forming process of forming a preliminary through hole in a portion of the bonded substrate where the through hole is to be formed, the preliminary through hole having a diameter smaller than that of the through hole, the preliminary through hole forming process being performed after the bonding process, and
   in the grinding process, the substrates in a pair and the sealing agent portion at an opening edge surface of the preliminary through hole are collectively ground to increase the diameter of the preliminary through hole and form the through hole.

6. The method of producing collectively the display panels according to claim 1, wherein
   in the cutting process, the bonded substrate is cut into separated bonded substrates, and
   each of the separated bonded substrates that are obtained in the cutting process is subjected to the grinding process.

7. The method of producing collectively the display panels according to claim 6, further comprising:
   a layering process of layering the bonded substrates via photo-curable fixing agent;
   a curing process of irradiating the photo-curable fixing agent with light rays and curing the photo-curable fixing agent; and
   a separation process of separating each of the bonded substrates included in a layered substrate from the photo-curable fixing agent, wherein
   in the cutting process, the bonded substrates that are layered are collectively cut into separated layered substrates; and
   each of the separated layered substrates that are obtained in the cutting process is subjected to the grinding process.

* * * * *